United States Patent
Covington

(10) Patent No.: US 6,267,881 B1
(45) Date of Patent: Jul. 31, 2001

(54) COOLING SYSTEM FILTER

(75) Inventor: Edward Allen Covington, Gastonia, NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/376,336

(22) Filed: Aug. 18, 1999

(51) Int. Cl.$^7$ .................... B01D 35/02; F28F 19/01
(52) U.S. Cl. ............. 210/167; 210/445; 210/450; 210/493.3; 165/119; 123/41.01
(58) Field of Search ................ 210/167, 168, 210/196, 445, 450, 493.1, 493.3; 165/119; 123/41.01

(56) References Cited

U.S. PATENT DOCUMENTS

| | | | |
|---|---|---|---|
| 152,360 | * | 6/1874 | Garstang . |
| 282,804 | * | 8/1883 | Thompson . |
| 754,014 | * | 3/1904 | Ross . |
| 1,554,924 | * | 9/1925 | Shapiro . |
| 2,082,866 | * | 6/1937 | Alexander . |
| 2,118,344 | | 5/1938 | Erickson . |
| 2,149,065 | * | 2/1939 | Miguel . |
| 3,191,672 | * | 6/1965 | Logan . |
| 3,682,308 | | 8/1972 | Moon . |
| 3,994,337 | * | 11/1976 | Asselman et al. . |
| 4,343,353 | * | 8/1982 | Tsopelas . |
| 4,357,236 | * | 11/1982 | Krueger . |
| 4,743,369 | | 5/1988 | Geermans et al. . |
| 5,281,331 | | 1/1994 | Golan . |
| 5,662,791 | | 9/1997 | Hurst et al. . |
| 5,718,281 | * | 2/1998 | Bartalone et al. . |

* cited by examiner

Primary Examiner—David A. Simmons
Assistant Examiner—Fred Prince
(74) Attorney, Agent, or Firm—Millen, White, Zelano & Branigan, P.C.

(57) ABSTRACT

An arrangement for filtering coolants used in internal combustion engines utilizes a panel filter disposed between a radiator core and an outlet header tank so as to trap particulates entrained in the coolant prior to returning the coolant to the engine. The panel filter has a pleated filter media surrounded by a gasket, which gasket seals between the outlet end of the radiator core and the outlet header tank.

12 Claims, 1 Drawing Sheet

COOLING SYSTEM FILTER

FIELD OF THE INVENTION

The present invention relates to cooling system filters. More particularly, the present invention relates to cooling system filters utilized with radiators or heat exchangers.

BACKGROUND OF THE INVENTION

During the last forty years, considerable effort has been extended to improve the durability of main power train components of engines such as pistons, rings and bearings. Exhaust gas emission regulations, engine performance and engine life have been the main measures of these improvements.

There is now a need for improving systems which are supplemental to the power train such as cooling systems and steering systems.

Water pumps remain as one of the leading replacement components in supplemental power train systems with bearing design failures and fluid contamination being main contributing factors in water pump damage. Fluid contamination is the result of little or no filtration capacity in cooling systems, settling of recirculating contaminants being the main phenomenon relied on to reduce particulate contamination. With respect to diesel engines, reducing sediment in engine coolant is a serious concern because cylinder liner cavitation is a major cause of premature failure that reduces engine life. With respect to gasoline engines, gasoline engine life has of late been extended considerably, and it is therefore necessary to extend the long-term cooling characteristics in gasoline engine blocks. Uneven cylinder cooling leads to exhaust gas emission changes, while uniform changes among the cylinders of an engine improves fuel economy and engine durability.

By reducing sediment, radiator life is extended, which improves heat transfer for a longer period of time. With modern automotive engines, radiator cooling loads have increased while engine compartments have gotten smaller due to high heat output of engines and increased transmission demands resulting from continuing improvements and attempted improvements in efficiency.

Since thermal transfer of heat is directly impacted by internal surface coatings of sludge and scale in radiators in engine blocks, eliminating these unwanted coatings is essential.

While internal combustion engine cooling systems are of primary concern, there are concerns regarding other cooling arrangements for other systems such as transmissions and lubricating systems, as well as heat exchangers in general, especially industrial heat exchangers.

SUMMARY OF THE INVENTION

In view of the aforementioned considerations, it is a feature of the present invention to provide a new and improved arrangement for filtering coolants.

This invention is directed to an arrangement for filtering coolants wherein the arrangement comprises a radiator or heat exchanger having a radiator core with an inlet side and an outlet side with each side covered by a header tank. A filter element is disposed between one side of the radiator core and the header tank covering that side to filter coolant as the coolant exits the radiator.

In a more specific aspect of the invention, the filter element is comprised of filter media and a peripheral exit gasket, wherein the gasket seals between the radiator core and header covering the core. In a still more specific aspect of the invention, the filter media is a pleated filter media, and in an even more specific aspect of the invention, the header and filter element are retained adjacent the core by a header extending vertically.

In a further aspect, the invention is directed to an arrangement with the aforementioned structure utilized with radiators for cooling fluid of internal combustion engines.

DETAILED DESCRIPTION

Figure 1:
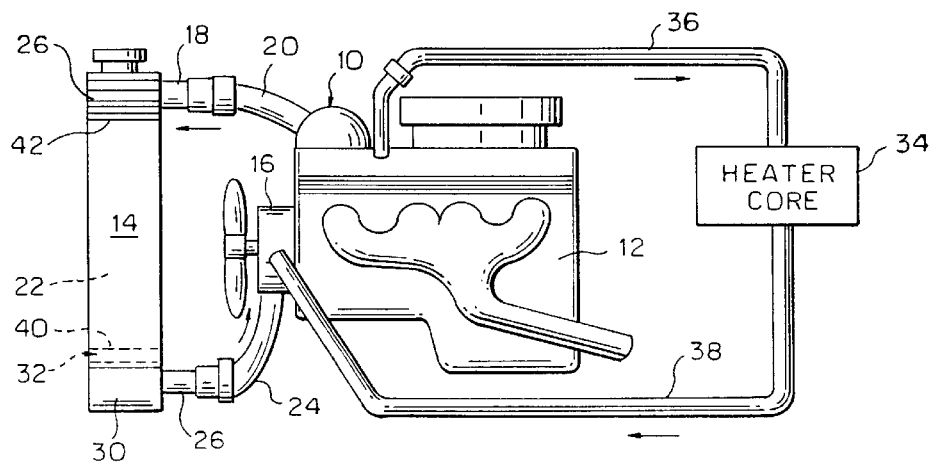
FIG. 1 is a schematic view of a radiator in combination with an internal combustion engine and subsystems which function in conjunction with the internal combustion engine.

Referring now to FIG. 1, there is shown a cooling system 10 for an internal combustion engine 12. The cooling system includes a radiator 14 through which coolant is pumped by a water pump 16 which pumps coolant fluid through the engine and into the radiator 14 by an inlet 18 that is connected to the block of the engine 12 by a hose 20. Coolant is cooled by a core 22 of the radiator 14 before being returned to the engine 12 by a hose 24 that is connected to an outlet 26 of the radiator 14. The inlet 18 and outlet 26 are connected to an inlet header tank 28 and an outlet header tank 30, respectively. In accordance with the present invention, a filter element 32 is disposed between the core 22 and the outlet header tank 30.

Also associated with the cooling system 10 is a heater core 35 that has an inlet hose 36 connected to the block 13 of the engine 12. A return hose 38 connects the heater core 34 to the water pump 16.

If the coolant circulating through these various components entrains solid particles, the particles will deposit in the radiator 14, the water pump 16, the engine 12 and the heater core 34 causing blockages and adverse heat transfer characteristics which in turn decrease engine efficiency. In accordance with the principles of the present invention, the radiator 14 includes the filter 32 as an integral component thereof in order to remove the particulate matter. Preferably, the filter 32 is disposed adjacent the outlet side 40 of the core 22 rather than the inlet side 42 of the core.

Figure 2:
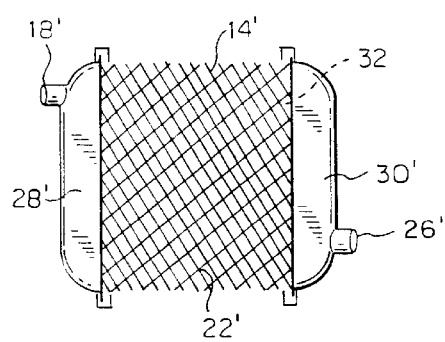
FIG. 2 is a front view of one embodiment of a radiator used with the internal combustion engine of FIG. 1 according to the prior art.
Figure 3:
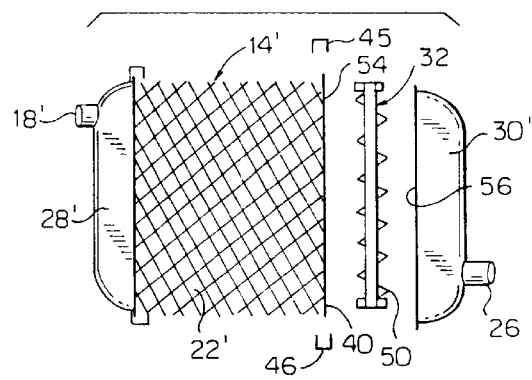
FIG. 3 is a front view, partly exploded, of a first embodiment of a radiator arrangement in accordance with the present invention wherein a filter element is integral with the radiator.

Referring now to FIGS. 2 and 3, there are shown front views of a first embodiment of a radiator wherein the radiator core 22' is disposed so that the coolant flows horizontally instead of vertically as is the case in FIG. 1. In the arrangement of FIGS. 2 and 3, the inlet header tank 28' and the outlet header tank 30' are both oriented vertically, as is the filter element 32. In this arrangement, the inlet opening 18' of the inlet header tank 28' is disposed adjacent the upper end of the radiator 14' while the outlet opening 26' is disposed adjacent the lower end of the outlet header tank 30'. Clips 45 and 46 retain the outlet header 30' to the outlet side of the core.

Figure 4:
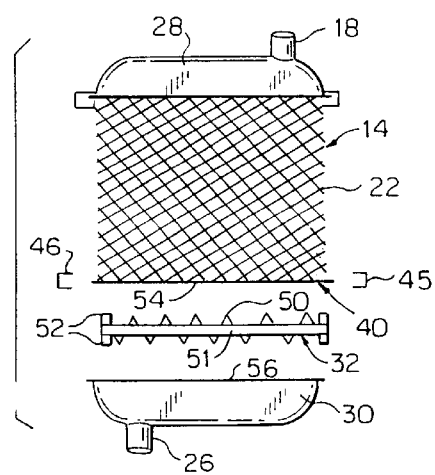
FIG. 4 is a front view, partly exploded, of a second embodiment of a radiator configured in accordance with the present invention which has a filter element integral therewith.

Referring now to FIG. 4, there is shown a second embodiment of the invention wherein the core 22 has vertical channels and the inlet header tank 28 extends horizontally on the top of the core while the filter 32 and outlet header tank 30 extend horizontally on the bottom of the core.

In both embodiments, the filter elements 32 and 32' are adjacent the outlet sides 40 and 40' of the radiator cores 22 and 22'. This is because as the coolant passes through the core 22 or 22' the coolant is cooled, and as it cools, substances which might be in solution at higher temperatures tend to separate out and form particles at lower temperature and are therefore trapped by the filter instead of being trapped in the engine block 13, water pump 16 or heater core 34 when the engine is not running and the coolant cools.

Figure 5:
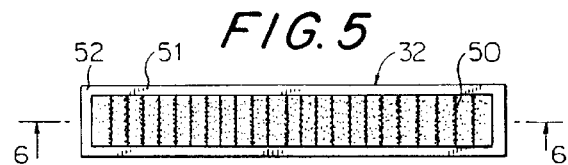
FIG. 5 is an enlarged planar view of a filter element used with the radiator arrangements of FIGS. 3 and 4.
Figure 6:
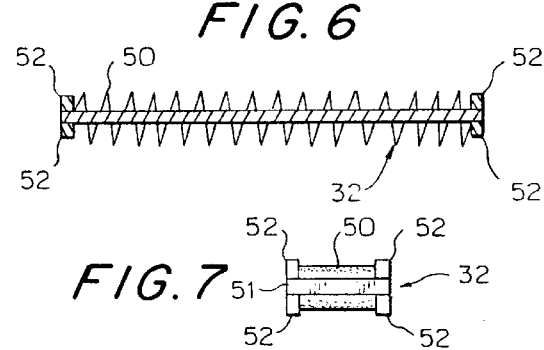
FIG. 6 is an enlarged side view of the filter element of FIG. 5.
Figure 7:
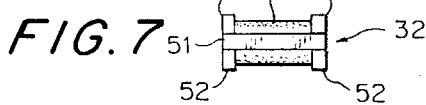
FIG. 7 is an enlarged end view of the filter element of FIG. 5.

Referring now to FIGS. 5, 6 and 7 where the filter element 32 is shown, it is seen that the filter element is preferably comprised of a filter media 50 which is supported by a frame 5' having a peripheral gasket 52. The peripheral gasket 52 seals with a peripheral end surface 54 of the core 22 or 22' and a peripheral surface 56 on the outlet header. Accordingly, the peripheral gasket 52 simply replaces the normal gasket used to seal the outlet header tank 30 or 30' with the core 22 or 22'.

As is seen in the drawings, it is preferable that the outlet 26 be positioned below the inlet 18.

During service intervals according to a maintenance schedule, the outlet header 30 or 30' is removed by releasing clips 45 and 46 so that the filter 32 may be replaced. Since the filter has trapped particulate contaminants, these contaminants are removed from the cooling system 10 upon removing the dirty filter 32 and replacing it with a clean filter.

While filtering cooling systems of internal combustion engines are of primary concern with respect to the present invention, the filtering concepts are applicable to other systems such as cooling systems for transmissions, lubricating systems and hydraulic systems such as power steering systems, as well as heat exchangers in general, especially industrial heat exchangers.

From the foregoing description, one skilled in the art can easily ascertain the essential characteristics of this invention, and without departing from the spirit and scope thereof, can make various changes and modification of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

We claim:

1. An arrangement for filtering coolants used in an internal combustion engine having a radiator, the arrangement comprising:

a radiator core within the radiator having passages through which the coolant passes, the radiator core having an inlet side adapted to receive heated coolant from the internal combustion engine and an outlet side adapted to dispense cooled coolant for recirculating through the engine, the outlet side being surrounded by a peripheral surface;

an inlet header tank on the inlet side of the radiator core, the inlet header tank having an inlet opening adapted for connection to the internal combustion engine;

an outlet header tank disposed over the outlet side of the radiator core, the outlet header tank having a periphery facing the peripheral surface at the outlet side of the radiator core and an outlet opening adapted for connection to the internal combustion engine, and a filter element disposed between the outlet header tank and the radiator core to retain particulate debris filtered out of the coolant and to prevent the particulate debris from entering the engine.

2. The arrangement of claim 1, wherein the filter element has a peripheral gasket surrounding a filter media, the peripheral gasket sealing between the peripheral surface of the radiator core and the periphery of the outlet header tank.

3. The arrangement of claim 2, wherein the outlet side of the radiator extends vertically and the filter element extends vertically.

4. The arrangement of claim 3, wherein the filter media is a pleated filter media.

5. The arrangement of claim 1, wherein the outlet side of the radiator extends vertically and the filter element extends vertically.

6. A radiator for cooling the coolant of an internal combustion engine, comprising:

a radiator core having an inlet side and an outlet side, each being covered by a header tank, and a filter element disposed between the outlet side of the radiator core and the header tank covering the outlet side.

7. The radiator of claim 6, wherein the outlet side of the radiator core and the filter media extend vertically.

8. The radiator of claim 7, wherein the filter element is comprised of a filter media and a peripheral gasket wherein the gasket seals between the radiator core and the header covering the core.

9. The radiator of claim 8, wherein the filter media is a pleated filter media.

10. The radiator of claim 6, wherein the outlet side and inlet side of the radiator core and the filter media extend horizontally.

11. The arrangement of claim 1 wherein the outlet is below the inlet.

12. The radiator of claim 6 wherein the outlet is below the inlet.

\* \* \* \* \*